United States Patent
Aboujaoude et al.

(10) Patent No.: US 7,024,423 B1
(45) Date of Patent: Apr. 4, 2006

(54) ORDER MANAGEMENT METHOD AND SYSTEM

(75) Inventors: Roger B. Aboujaoude, Ocean Township, Monmouth County, NJ (US); Hossein Eslambolchi, Los Altos Hills, CA (US); Jamie C. Montero, Tinton Falls, NJ (US)

(73) Assignee: AT&T Corp., New York, NY (US)

( * ) Notice: Subject to any disclaimer, the term of this patent is extended or adjusted under 35 U.S.C. 154(b) by 501 days.

(21) Appl. No.: 10/444,417

(22) Filed: May 23, 2003

(51) Int. Cl.
*G06F 17/30* (2006.01)

(52) U.S. Cl. .................... 707/102; 707/100; 707/101; 707/103 R; 707/104.1

(58) Field of Classification Search ............... 707/102, 707/100, 101, 103 R, 104.1
See application file for complete search history.

(56) References Cited

U.S. PATENT DOCUMENTS

| | | | | |
|---|---|---|---|---|
| 4,809,220 A | * | 2/1989 | Carlson et al. | 358/1.18 |
| 5,317,646 A | * | 5/1994 | Sang et al. | 382/175 |
| 5,349,487 A | * | 9/1994 | Egawa et al. | 360/234.8 |
| 5,738,329 A | * | 4/1998 | Woodard | 248/523 |
| 6,668,354 B1 | * | 12/2003 | Chen et al. | 715/517 |
| 6,772,144 B1 | * | 8/2004 | Brid et al. | 707/3 |
| 2003/0195879 A1 | * | 10/2003 | Pereymer et al. | 707/4 |
| 2004/0103048 A1 | * | 5/2004 | Vitulli et al. | 705/28 |
| 2005/0010495 A1 | * | 1/2005 | Shih et al. | 705/27 |

FOREIGN PATENT DOCUMENTS

| | | | |
|---|---|---|---|
| EP | 1093068 A2 | * | 4/2001 |
| JP | 8295407 A | * | 11/1996 |
| WO | WO 00/75839 A2 | * | 12/2000 |

OTHER PUBLICATIONS

Zimmerman et al., Service-Oriented Architecture and Business Process Choreography in an Order Management Scenario: Rationale, Concepts, Lesson Learned, ACM, Oct. 16-20, 2005 San Diego California, pp. 301-312.*

ABBYY Software Automated Forms Processing, Printed pp. 1-33.*

Hammainen et al., Distributed Form Management, ACM Transactions on Information Systems, vol. 8, No. 1, Jan. 1990, pp. 50-76.*

* cited by examiner

*Primary Examiner*—Frantz Coby

(57) ABSTRACT

A method and system for generating service forms and service orders in an order management system. To avoid entry-related mistakes, a master form is used to enter verified data about a customer and the services to be provisioned. The data entered into the master form is then used along with scheduling and query-related data to create a series of substantially pre-filled service forms which contain information relevant to the requested service.

30 Claims, 5 Drawing Sheets

AT&T ORDER MANAGEMENT SYSTEM  /200

MASTER FORM  /201

Customer ID: Apex-01
Date: January 23, 2003

1. Customer Name: Apex Corp.
2. Tech Contact: J. Montero
3. Address: 133 Corporate Drive (HQ)
4. Master Contract: Apex01234
   Bedminster, NJ 08854
6. Schedule: SchApex01234
5. Customer Contact: James Jones
7. Telephone: 908 555-1222  /202
   Generate Form: Y
   Field Query: Y  /204

---

8. ATM          4 Ckts     Boston to HQ    123 State Street Boston Mass.
                           8.1 Port: 12, 13,14,15
                           8.2 Service Completion Date: July 1, 2003

9. T-1          7 Ckts     NYC to HQ    55 Broadway, NYC
                           9.1 Ports: 34,35,36,37,38,39,40
                           9.2 Service Completion Date: May 1, 2003

10. Frame       4 Ckts     Denver to HQ    6800 PKWY Drive, Denver
                           10.1 Ports: 55,56,57,58
                           10.2 Service Completion Date: Oct. 1, 2003

11. Billing: Schedule Apex01234
12. Provisioning Team: MT033/Datatransport

Fig. 2

Schedule

|  | NYC-HQ | Boston-HQ | Denver-HQ |

Start_____|_____|_____|

Feb
2003        7 T-1 Ckts       4 ATM Ckts      4 Frame Ckts
            May 1, 2003      July 1, 2003    October 1, 2003

Customer ID: Apex-01
Schedule: SchApex01234
Master Contract: Apex01234

Fig. 3

AT&T ORDER MANAGEMENT SYSTEM

Next T-1 FORM

Customer ID: Apex-01
Date: March 31, 2003

1. Customer Name: Apex Corp.
2. Tech Contact: J. Montero
3. Address: 133 Corporate Drive (HQ)
   Bedminster, NJ 08854
4. Master Contract: Apex01234
6. Schedule: SchApex01234
5. Customer Contact: James Jones
7. Telephone: 908 555-1222

Service:

T-1 (1.544MBPS)    1 Ckt    NYC to HQ    55 Broadway, NYC
Assigned Port@ HQ: 34

NYC Contact:_____(Matt Flynn)
Tel: 212 555-1234
(verify advanced access to telco closet with aid of landlord)
Comments___Verified NYC Distribution Frame:_____(NYC-023)
(verify distribution frame on southwest wall is nyc-023 and
not Distribution frame 233 on eastern wall basement POE)

Comments___NYC-023 southwest wall correct

Test Date:_____( May 5, 2003)

Turn-Up Date:_____( May 10, 2003)

11. Billing: Schedule Apex01234
12. Provisioning Team: MT033/Datatransport

Fig. 5

ORDER MANAGEMENT METHOD AND SYSTEM

FIELD OF THE INVENTION

The disclosed invention broadly relates to an interactive order entry and management system for processing and provisioning products and services.

BACKGROUND OF THE INVENTION

Accurately documenting the needs of a customer is critical in providing the level of customer service that will ensure repeat business and customer satisfaction. Prior to the use of computers, the written form or sales form was the mechanism by which salespersons noted the specific needs of customers and used to ultimately provision the requested products and/or services. These sales forms were often filled out in the presence of the customer and in many cases witnessed and acknowledged by the customer before any work commenced or any product was delivered. Moreover, the sales form was the basis upon which all other departments such as billing, shipping, and production relied in provisioning and meeting a customer's needs and expectations. A wrong or an ambiguous entry in the sales form often had catastrophic consequences, such as the delivery of incorrect quantities, level of support, or unusable products.

A great deal has changed with the advent of computerized order processing. In today's computerized environment, customer service representatives are able to immediately access a customer's records and create real-time orders for new or additional products or services. Although the computerized creation of these new orders is done in a more efficient and expedited manner, the process of taking orders remains largely unchanged from the days of the printed form wherein customer information was for the most part handwritten. The accuracy of the information provided under such computerized order entry systems is largely dependent upon the accuracy of the information provided by the customer during the ordering process. Under such circumstances, it is no surprise that errors in prior orders are perpetuated under the belief that what was perceived to be correct in a previous order is correct and applicable in the provisioning of subsequent orders.

Moreover, and despite the efficiencies attained by a computerized order processing environment, such order entry systems remain vulnerable to the occasional on-screen entry mistake. In today's hurried environment, mistakes can and do occur more often than may be expected. To minimize these on-screen mistakes, current order managements systems have begun to employ logic checks as criteria before data may be entered as part of a permanent record. Zip codes, for example, are checked for validity when the state of a customer is entered in a record; the area code of a telephone number is checked against known valid area codes. These logic checks have also been used to ensure that the correct type of data is entered in on-screen data fields. For example, fields having been designated as alpha-character fields will only accept alphabetical characters—such as in the first and last name of a customer or a numeric-only field will only accept number characters in a field having numeric attributes, such as a social security number or a cost field. These logic checks have ensured that only logical and expected type data is provided in the ordering process.

Despite these advances, the risk of entering incorrect data which may jeopardize order fulfillment and customer satisfaction remains relatively high for organizations handling orders in high volumes and for organizations seeking to attain a high quality of service. Accordingly, there is a need for an order management method and system which minimizes the propagation of incorrect data and which minimizes the need for re-entry of reusable customer-related data.

SUMMARY

The present invention provides a method and system for generating service forms and service orders in an order management system. A master form is used to enter verified data about the customer and the services to be provisioned. The data entered is then used along with scheduling and query related data to create a series of service forms which contain information relevant to the particular service. The service forms and resulting service orders are re-generated during each subsequent change in the information provided to the master form, query or schedule files. An advantage of the present invention is the minimization of data entry related errors in the creation of subsequent service orders.

BRIEF DESCRIPTION OF THE DRAWINGS

These and other features of the present invention will best be understood by reference to the following brief description of a preferred embodiment of the invention, taken in conjunction with accompanying drawings, in which:

FIG. 2 illustrates an exemplar master form used in an order management system to create service forms;

FIG. 3 illustrates a schedule for use with the master form to create service forms;

FIG. 5 illustrates an exemplar T-1 service form created from data contained in the master form, query file and schedule file shown in FIG. 3.

DETAILED DESCRIPTION

Figure 1:
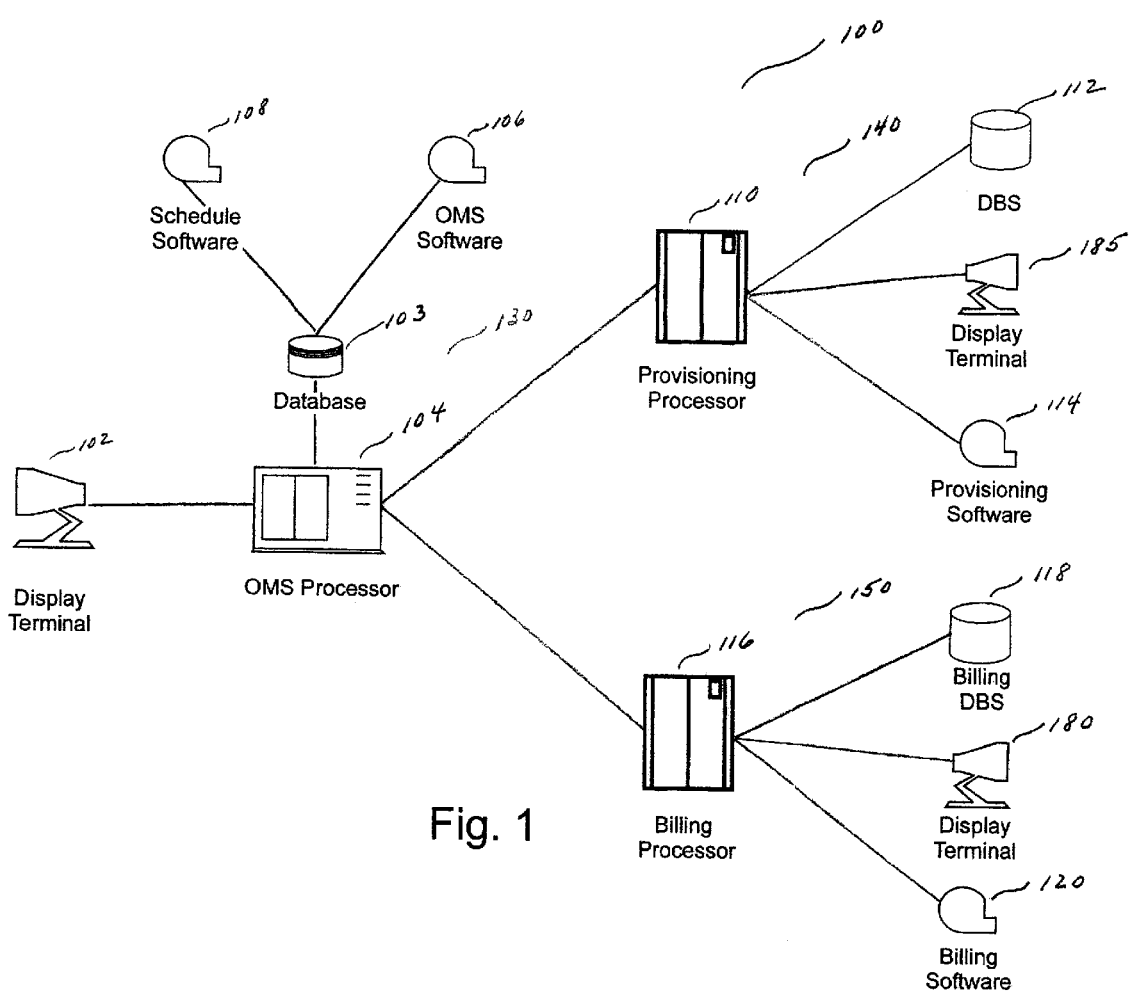
FIG. 1 illustrates a functional block diagram of an order processing system.

FIG. 1 illustrates an order processing system 100 comprising an order management system ("OMS") 130, provisioning system 140 and a billing system 150. Upon the sale of products and/or services, a customer service representative ("CSR") creates a set of records detailing the terms of the sale, including customer and service or product related information. For purposes of illustration, the following discussion shall reference the provisioning of services, although it should be understood that the present invention is also applicable to the delivery of products. Generally, the present invention may be used in the provisioning telecommunication, CATV, data, and Internet services as well as any other service and/or product which requires scheduling and order processing. The CSR enters basic information, such as name and address, as well as service-specific data, such as terminating sites, service contacts, speeds and protocols. Moreover, the OMS system 130 creates, based on information provided to the master form, a schedule of proposed service due dates, ordering timeframes, test and turn-up timeframes. In effect, the CSR enters and correlates the basic information about the customer and the terms of the sale while the OMS system 130 takes that information and creates a schedule with the proposed timeframes for the provisioning of services. The CSR enters such customer and sale information through a display terminal 102, which is in communication with and serves as the point of command entry to the order management processor ("OMS processor") 104. The set of initial records created by the CSR functions as the master form from which templates and subsequent service forms for such services are created. In particular, the information in the master form depends upon the schedule and related queries, service-related data, and customer background information and is used to create a set of anticipated service forms that will be used to complete the provisioning of the services. These service forms are current and in-step with the most current information and the schedule for the provisioning of the services. It should be understood that there is a distinction between a service form and a service order. A service form is a displayable form having pre-filled customer data and for entering other data necessary for the provisioning of a requested service. A service order, on the other hand, is a product of a completed service form; it contains information about one or more services and is distributable to a designated or responsible group for the provisioning of the requested service.

The order management system 130 comprises an OMS processor 104, display terminal 102, database 103, OMS software 106, schedule software 108, and sufficiently allocated memory space in OMS processor 104. The OMS processor 104 is the main controller for the processing and management of all services to be provisioned and comprises a database 103 containing background and processing information about each customer as well as a schedule for completing the provisioning of one or more services. Resident within the OMS database 103 and stored therein are schedule software 108 and OMS software 106 that are retrievable and used by OMS processor 104 to process, update and manage service forms, service orders and related schedules.

As data on service forms are entered, verified and completed, service orders are created and forwarded to the provisioning system 140 comprising provisioning processor 110, database 112, display terminal 185 and provisioning software 114. By the time the service orders are received by the provisioning processor 110, the services orders have preferably been verified for accuracy. The service orders received by the provisioning system 140 are parsed in accordance with the provisioning software 114 and data is detected within certain fields in the service orders that act as triggers and route codes for the provisioning processor 110 to select and distribute all or portions of the service order to the correct or responsible department or organization. A routing table is included in database 112 for routing the selected service orders (based on the detected fields) to the appropriate processing group. The fields are correlated to specific destination addresses of the provisioning groups. For example, upon subsequent completion of a service order for the provisioning of a particular telecommunication service, such as T-1 service, the provisioning processor 110 detects the service field "T-1" in the completed service order and immediately forwards all or corresponding portions of the service order to the T-1 testing and installation group for confirmation and the scheduling of installation and testing dates. Other portions of the service order for T-1 service may be provided to other related service groups such as quality assurance and equipment provisioning departments. Concurrently, the provisioning processor 110 detects the relevant data and forwards a request to the communications company or third party service provider responsible for the installation of a local loop to the termination sites. In addition, the provisioning processor 110 may also function as a source of updating the master form, service orders (through a service form) or the scheduling of services of a customer. The updating is accomplished by engaging the OMS processor 104 and the schedule and OMS software modules 108, 106 to update customer-specific schedules which may affect the subsequent generation of service forms and the start dates for activating and billing the selected services. As part of the management process, OMS processor 104 also communicates with and engages the billing processor 116 and its associated database 118 and billing software 120 to create a billing record of the proposed addition of T-1 service.

FIG. 2 illustrates a basic master form 200 from which subsequent service forms used to provision the requested services will be created. As discussed above and in accordance with the present invention, the CSR creates a master form 200 containing basic customer information, service-related information and internal order processing information. As shown, fields 1–7 provide a record of the basic background information or information that is common to most of the subsequent service forms and service orders generated. Service-related information is entered and stored in fields 9–10. These fields are service-oriented and are used in the generation of service-specific forms. For example, in the event that a customer requested the addition of a T-1 circuit (ckt), the service forms to be generated and made readily available for order entry would contain the data in field 9 with background information such as those found under fields 1–7. Fields 8 & 10 would under the circumstances not be used in the creation of a readily available T-1 service form or service order since such fields relate to non-T-1 service.

In addition, master form 200 contains internal processing fields, such as fields "Generate Form" 202, "Field Query" 204 and fields 11 & 12. These fields are operation fields which determine the manner in which service forms and service orders are processed and distributed within the order processing system 100. The Generate Form field is an operational field that triggers the automatic creation of anticipated service forms that are based on the background information of the customer, service-related data and associated schedule of service provisioning. A master form 200 with a Generate Form field set to "Y", in accordance with the present invention, will create a series of anticipated "next in use" service forms to be used in the provisioning of a service. The "next in use" service form for each service is preferably and automatically created upon the creation of a master form 200. At the time that a master form 200 is completed by a CSR, each of the anticipated services (ATM, T-1, & Frame Relay) will each have an associated and anticipated service form for ordering the service. In this manner, service form data may be verified prior to the actual order being initiated by the CSR and the customer. Moreover, a customized service form created in advance of actual ordering will expedite the ordering process by including verified information and data that is known and acknowledged to be necessary for the provisioning of the service. However, it should be understood that the availability of the service forms may optionally be available only during periods of expected ordering of each of the services—that is, a service form may not be available after a service has been provisioned and activated.

In addition, the master form 200 uses a "Field Query" 204 field which service provisioning personnel and the like may use to further expedite the provisioning process. More specifically, a Field Query 204 set to "Y" will in accordance with the present invention, permit any authorized personnel to insert customized queries which are specifically associated with one or more fields in the service form and which require confirmation or further customer-based instruction. A CSR about to complete a service form may be required according to these field-based queries to further ascertain the customer's service provisioning requirements.

The OMS processor 104 and OMS software 106 utilize the data entered by the CSR to create these pre-order service forms. The parameters necessary to create these service forms, such as display format and storage formats, are resident in the OMS software 106 and are also contingent upon the data entered during the creation of the master form 200. Customer-specific data entered by the CSR and in particular the data created through the use of schedule software 108 are used to create these service forms and ultimately distribute the resulting service orders.

Once the CSR has created the master form 200, the next access to the order management system 130, which requires the completion of a service form, will immediately cause a query to the CSR to select which service has been requested (i.e., T-1, ATM, Frame). Upon selection, a corresponding and substantially pre-filled service form will be displayed on display terminal 102. Moreover, and in the event that the Field Query option has been set to "Y", the CSR will see one or more queries posted by other personnel which the CSR must verify or obtain addition information to complete the service form. Field query entries are made by accessing any of the order processing terminals, such as terminals 102, 180, and 185, and are inserted into the service forms through the use of an add queries function provided by the OMS software 106. The queries are used as a further level of data verification and as a further means of expediting the provisioning process. Accordingly, the inserted queries may be added by any and all personnel involved in the provisioning of the services.

In addition to entering the service-related information and basic customer background information, the CSR will initiate the creation of a schedule for the provisioning of the selected services by invoking the use of the schedule software module 108 during the creation of the master form or the subsequent modification of proposed dates in the pre-filled service form. As shown in FIG. 3, a schedule for the provisioning of the services is created by the OMS system 130 at the time that the master form 200 is created. The schedule details the service-related information such as the services and the number of circuits (ckts) to be provided, the expected ordering or activation dates, and the customer locations to be provisioned with these services. The OMS system 130 utilizes the schedule timeframes or periods therein for the activation of requested services. In particular, the OMS system 130 detects one or more time periods in the schedule from which service forms and service orders may be created and re-created. The time periods are applied to corresponding service forms and service orders and are used to further designate timeframes such as testing and installation time periods. The schedule is maintained under schedule software 108 in database 103 of the order management system 130. The schedule is accessible by display terminals 102 and indirectly by access terminals 185, 180 connected to provisioning processor 110 and billing processor 116. By having designated timeframes, site locations, as well as other service-related information such as port numbers, etc. (shown in FIG. 2), the schedule may be used to create a series of service forms likely (or anticipated) to be used during the next time that a customer makes a service request. The schedule, service forms and the master form 200 are preferably linked through the use of a unique identifier such as a customer id or contract number (indexing fields) or any other record identifier. By having a linking field or identifier, the OMS software 106 may select and utilize the corresponding master form 200 and schedule to create the service forms for use by the CSR. Moreover, the linking of the master form, schedule and the service forms with an indexing field facilitates the storing and fetching or record retrieving process.

Figure 4:
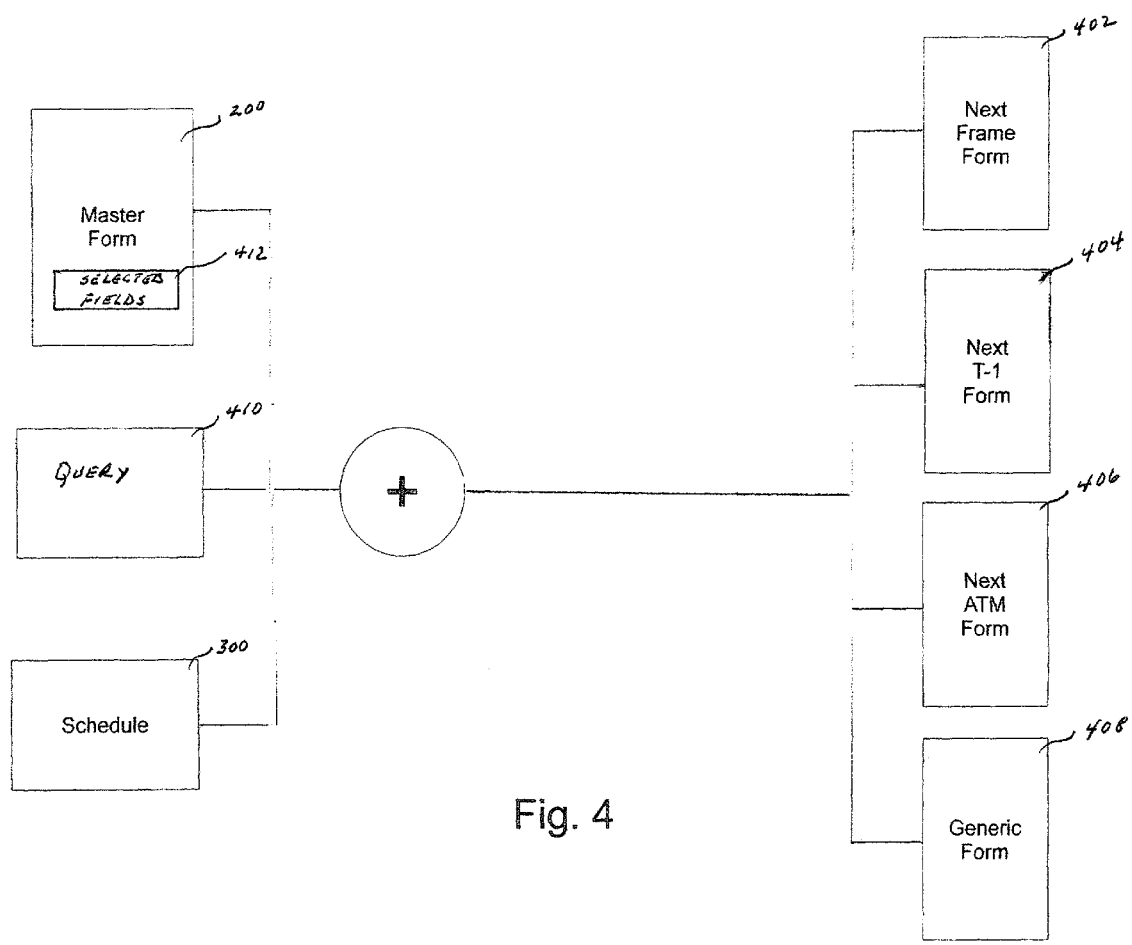
FIG. 4 illustrates a functional diagram of the service form creation process from data contained in the master form, query file and schedule file shown in FIG. 3.

Procedurally, and as shown in FIG. 4, the OMS software 106 makes use of the data available in the master form 200, query file 410 and schedule file 300 to generate a series of "next in use" service forms 402, 404, 406, and 408. Through a merge process, the OMS software 106 selects service-based selected fields 412 from master form 200, selects corresponding queries associated with each of the selected fields 412 from query file 410, and scheduling parameters in schedule file 300 to create (next or "next in use") service forms 402, 404, 406, and 408. For example, in the creation of a frame relay service form 402, master form 200 fields 1–7 and service field 10 will be used, while an ATM service form 406 will use master form 200 fields 1–7 and service field 8. As is readily apparent, master form 200 fields 1–7 are designated generic or common fields used to identify the customer and provide common background information. Fields 8, 9 and 10 are service-related fields which are specific to the provisioning of a particular service and will appear only on a corresponding service form. Moreover, the service form may extract information from fields such as 11 and 12 which are necessary for internal processing of the service order and which are of no consequence to the customer. Referring back to FIG. 2, the master form 200 contains a billing field 11 which designates the pricing schedule (Schedule Apex 01234) associated with the agreed to services and a designated provisioning team (MT033/ Datatransport) responsible for the implementation of the services. These internal fields function as route codes to distribute service orders to both the billing system 150 and provisioning system 140. The selection of the fields for the creation of the service forms are pre-determined by an algorithm within the OMS software 106. Alternatively, and in accordance with the invention, a CSR or any other authorized personnel may enter a command and override the selection of the standard fields associated with a particular service form and create a series of service forms which are customized in accordance with the needs of the customer. In either event, a series of service forms are generated at the time that the master form 200 and schedule are completed and are readily available to meet the needs of the customer during a subsequent request for service. Moreover, the data in the master form, query, and schedule files 200, 410, 300 may all be verified prior to the completion of a service form. It should also be understood that these service forms 402, 404, 406, and 408 are also immediately re-created during subsequent changes made to the master form, query file or schedule file 200, 410, 300 since a change in any of the relied upon data will affect the accuracy of the pre-inserted data in the service forms. In this manner, the CSR will always have the latest service form for the next call or service request made by the customer.

Shown in FIG. 5 is an illustration of a service form created in accordance with the present invention. In particular a T-1 service form is shown with the latest information provided in the master form, query file and schedule file 200, 410, 300 associated with a customer. Fields 1–7 502 and the indexing customer field 500 are the generic or common fields designated for use with all service forms and which provide the basic name, address, contact information and internal identifying fields, such as master contract and schedule ids as well as technical contacts. These fields are categorized as generic, service-specific or internal by the OMS software 106 or may be reclassified by an authorized CSR. Service-specific fields such as fields 8, 9, and 10 of the master form 200 are triggers for the OMS software to create related service forms. The entry of the number, location and type of ckts in the master form 200 is sufficient to initiate the subsequent generation and maintenance of corresponding service forms. OMS software 106 detects such service related entries during the creation of the master form 200 by the CSR to create or re-create corresponding service forms.

In FIG. 5, the service-related entries are reproduced as they were entered in the master form 200 to minimize data entry errors and also include service-related data that is selectable from the initial data provided in master form 200. In particular, the assignment of a port 34 at a customer's headquarters 504 is selectable data which the CSR or OMS may assign, record and otherwise maintain. In addition, service-related queries have been entered subsequent to the generation of the master form 200. The queries 506 have been entered as a further check in the provisioning of the services. As shown, the queries require responsive comments to the queries posed. In particular, the queries shown in FIG. 5 request the verification of access availability of the Telco closet and the location of the point-of-entry into the customer's premises. Responses to these queries are entered in the comments section of the T-1 service form. Other service related data necessary to complete the service form are provided as appropriate on fields provided and determined by OMS software 106 to be necessary for the provisioning of the services. Test dates and turn-up dates 508, for example, are the type of field data that may be initially entered by the OMS system 130 but may also be discussed with a customer, and changes, if applicable, may be entered on the service form displayed on display terminal 102. In addition, the service form will preferably contain the routing codes necessary to distribute the completed service order to the correct and corresponding organizations. As shown in fields 11 and 12, route codes Schedule Apex01234 and MT033/Datatransport are use to properly distribute the completed service order to the provisioning team and to the billing organization.

The foregoing description of an embodiment of the present invention should be considered as illustrative and not as limiting. The disclosed variations in the implementation of an order management system and method of creating and displaying service forms are indicative of the many possible embodiments to the present invention. Various other changes and modifications will occur to those skilled in the art for accomplishing the same result, and for operating in substantially the same way without departing from the true scope of the invention as defined in the claims appended hereto.

What is claimed is:

1. A method of creating displayable service forms in an order management system comprising:

creating a master form having a record identifier and selectable fields;

entering on the master form, customer and service-related information in the selectable fields;

selecting a first group of fields from the selectable fields containing customer-related information;

selecting a second group of fields from the selectable fields containing service-related information;

merging the information in the first and second groups of fields to create one or more service forms containing the first and second groups of fields, the first group of fields included in each of the service forms and the second group of fields included in one of the service forms;

re-creating the one or more service forms upon a change in any of the first or second groups of fields in the master form; and displaying on a terminal display the one or more service forms upon the entry of the record identifier.

2. The method of claim 1, further comprising the step of creating a schedule for provisioning services, and using the content of the schedule to create and re-create the one or more service forms.

3. The method of claim 2, wherein the step of using the content of the schedule to create and re-create the one or more service forms comprises detecting within the schedule one or more time periods and creating and re-creating the one or more service forms in accordance with the selected services and within one or more time periods.

4. The method of claim 3, further comprising the step of designating on the master form whether the one or more service forms are to be subsequently generated upon the completion of the master form.

5. The method of claim 4, further comprising the step of designating on the master form whether service queries are to be used in the service forms generated upon the completion of the master form.

6. The method of claim 5, further comprising the step of correlating and inserting queries to a selected field in one or more of the service forms.

7. The method of claim 6, further comprising the steps of parsing a service order and detecting a field indicative of a destination, correlating the detected field with a destination address, and routing the service order to the destination designated by the destination address.

8. The method of claim 7, further comprising the step of routing a service order to a third party service provider.

9. The method of claim 8, further comprising the steps of accessing a provisioning system, interfacing the provisioning system with the order management system, updating customer-related data in the order management system from the provisioning system and then routing the one or more re-created service orders to the one or more destination addresses.

10. The method of claim 9, further comprising the step of inserting one or more queries to one of the service forms.

11. The method of claim 10, further comprising the step of detecting a request for the generation of service forms in a generate form field and then creating one or more service forms.

12. The method of claim 11, further comprising the step of querying a customer based on a query entry made to a service form and then entering responsive data to the service form.

13. The method of claim 12, further comprising the step of, after completing the master form, selecting a service to be provisioned and automatically retrieving a substantially pre-filled service form for processing and distribution.

14. The method of claim 13, further comprising the step of linking the master form with each service form with an indexing field and storing the master form and each service form in an order management database.

15. The method of claim 14, further comprising the step of merging selected data from the master form, schedule and a query file to create and re-create the one or more service forms.

16. A method of creating and re-creating displayable service forms in an order management system comprising:

creating a master form having a record identifier and selectable fields;
entering on the master form customer and service-related information in the selectable fields;
selecting a first group of fields from the selectable fields containing customer-related information;
selecting a second group of fields from the selectable fields containing service-related information;
merging the information in the first and second groups of fields and merging the merged first and second groups of fields with fields selected from a schedule and a query file to create and re-create the one or more service forms, the first group of fields included in each of the service forms and the second group of fields included in one of the service forms;
re-creating the one or more service forms upon a change in any of the first or second groups of fields in the master form; and
displaying on a terminal display the one or more service forms upon the entry of the record identifier.

17. The method of claim 16, further comprising the steps of creating the schedule for provisioning services, and using the content of the schedule to create and re-create the one or more service forms.

18. The method of claim 17, wherein the step of using the content of the schedule to create and re-create the one or more service forms comprises detecting within the schedule one or more time periods and creating and re-creating the one or more service forms in accordance with the selected services and within one or more time periods.

19. The method of claim 18, further comprising the step of designating on the master form whether the one or more service forms are to be subsequently generated upon the completion of the master form.

20. The method of claim 19, further comprising the step of designating on the master form whether service queries are to be used in the service forms generated upon the completion of the master form.

21. The method of claim 20, further comprising the step of correlating and inserting queries to a selected field in one or more of the service forms.

22. The method of claim 21, further comprising the steps of parsing a service order and detecting a field indicative of a destination, correlating the detected field with a destination address, and routing the service order to the destination designated by the destination address.

23. The method of claim 22, further comprising the step of routing a service order to a third party service provider.

24. The method of claim 23, further comprising the steps of accessing a provisioning system, interfacing the provisioning system with the order management system, updating customer-related data in the order management system from the provisioning system and then routing the one or more re-created service orders to the one or more destination addresses.

25. The method of claim 24, further comprising the step of inserting one or more queries to one of the service forms.

26. The method of claim 25, further comprising the step of detecting a request for the generation of service forms in a generate form field and then creating one or more service forms.

27. The method of claim 26, further comprising the step of querying a customer based on a query entry made to the service form and then entering responsive data to the service form.

28. The method of claim 27, further comprising the step of, after completing the master form, selecting a service to be provisioned and automatically retrieving a substantially pre-filled service form for processing and distribution.

29. The method of claim 28, further comprising the step of linking the master form with each service form with an indexing field and storing the master form and each service form in an order management database.

30. A system for creating and re-creating displayable service forms in an order processing system comprising:
a order management system comprising a processor, database, and schedule and order management software modules, the processor in communication with the database for accessing the scheduling and order management software modules, the order management system operative for creating a master form having a customer id and selectable fields; entering on the master form customer and service-related information in the selectable fields; selecting a first group of fields from the selectable fields containing customer-related information; selecting a second group of fields from the selectable fields containing service-related information; merging the information in the first and second groups of fields and merging the merged first and second groups of fields with fields selected from a schedule and a query file to create and re-create the one or more service forms, the first group of fields included in each of the service forms and the second group of fields included in one of the service forms; re-creating the one or more service forms upon a change in any of the first or second groups of fields in the master form; and displaying on a terminal display the one or more service forms upon the entry of a record identifier.

* * * * *